United States Patent [19]
Johnson

[11] Patent Number: 6,086,378
[45] Date of Patent: Jul. 11, 2000

[54] EDUCATIONAL GAME FOR TEACHING MUSICAL NOTATION

[76] Inventor: Gregory W. Johnson, 8576 W. Grantosa Dr., Milwaukee, Wis. 53225

[21] Appl. No.: 09/195,019

[22] Filed: Nov. 18, 1998

[51] Int. Cl.[7] ................................................. G09B 19/22
[52] U.S. Cl. ........................ 434/128; 434/129; 273/236; 273/273
[58] Field of Search ..................... 434/128, 129, 434/430; 273/236, 271, 273, 281, 282.1, 282.2, 288, 289

[56] References Cited

U.S. PATENT DOCUMENTS

| | | | |
|---|---|---|---|
| 1,099,372 | 6/1914 | Hughes | 434/430 |
| 1,114,139 | 10/1914 | Hoffmann | 273/273 |
| 1,558,083 | 10/1925 | Gittens | 273/236 |
| 1,945,398 | 1/1934 | Gregg | 273/236 |
| 2,447,213 | 8/1948 | Sledge . | |
| 3,070,371 | 12/1962 | Hearle | 273/287 |
| 3,727,511 | 4/1973 | Piper . | |
| 3,728,930 | 4/1973 | Maron . | |
| 3,728,931 | 4/1973 | Leonard . | |
| 3,733,957 | 5/1973 | Peirano et al. . | |
| 4,277,090 | 7/1981 | Lusi . | |
| 4,464,971 | 8/1984 | Dean . | |
| 4,819,539 | 4/1989 | Searing | 84/476 |
| 4,832,605 | 5/1989 | Bragin . | |
| 5,254,008 | 10/1993 | Dawson . | |

*Primary Examiner*—Robert A. Hafer
*Assistant Examiner*—Bena B. Miller
*Attorney, Agent, or Firm*—Andrus, Sceales, Starke & Sawall

[57] ABSTRACT

An educational game for teaching children how to read music by teaching them the locations of musical notes on a musical staff. The game which may be played by two or more players includes a game mat having a flat playing surface with musical clef and staff indicia depicted thereon, and a means for selecting musical notes such as playing cards or a spinner type indicator having the musical notes printed thereon. The game is played by one player selecting a musical note by choosing a card from the deck of playing cards or spinning the spinner. Once a musical note has been selected, the player selecting the musical note communicates the musical note to the other players who are standing along one side of the game mat. The players standing along side the game mat quickly locate and stand on all of the musical note positions within the lines and spaces of the musical staff depicted on the game mat. The player who correctly locates and stands on the most musical note positions generally wins the game. A time piece indicator may be used to limit the amount of time the players have for locating and standing on all of the musical note positions on the musical staff game mat.

24 Claims, 4 Drawing Sheets

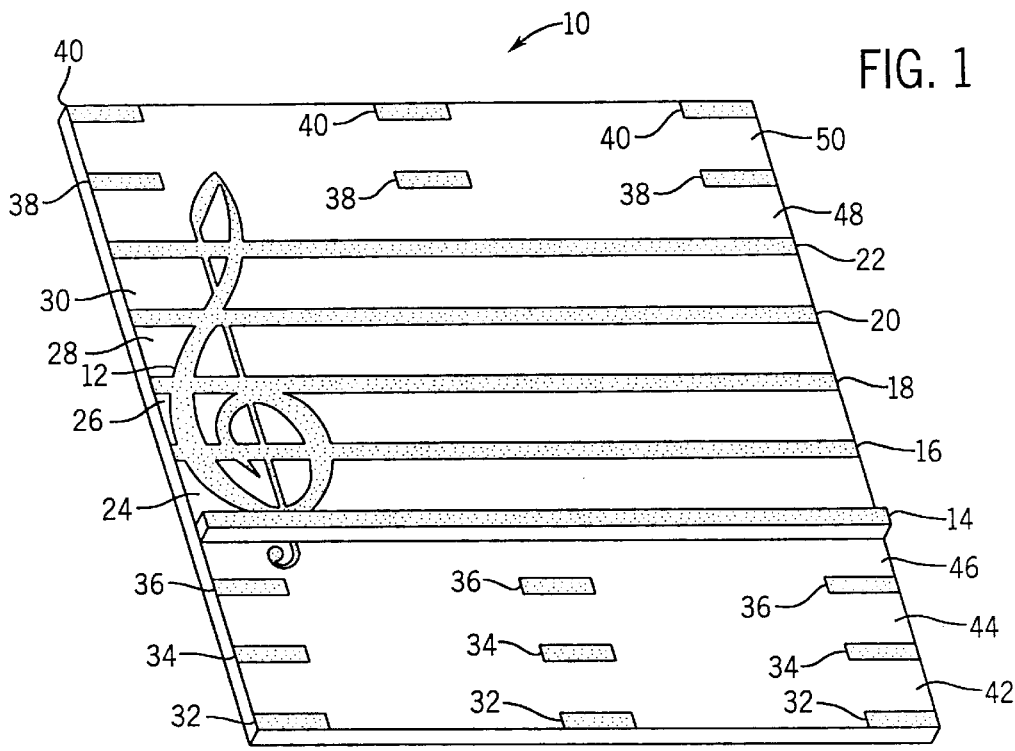
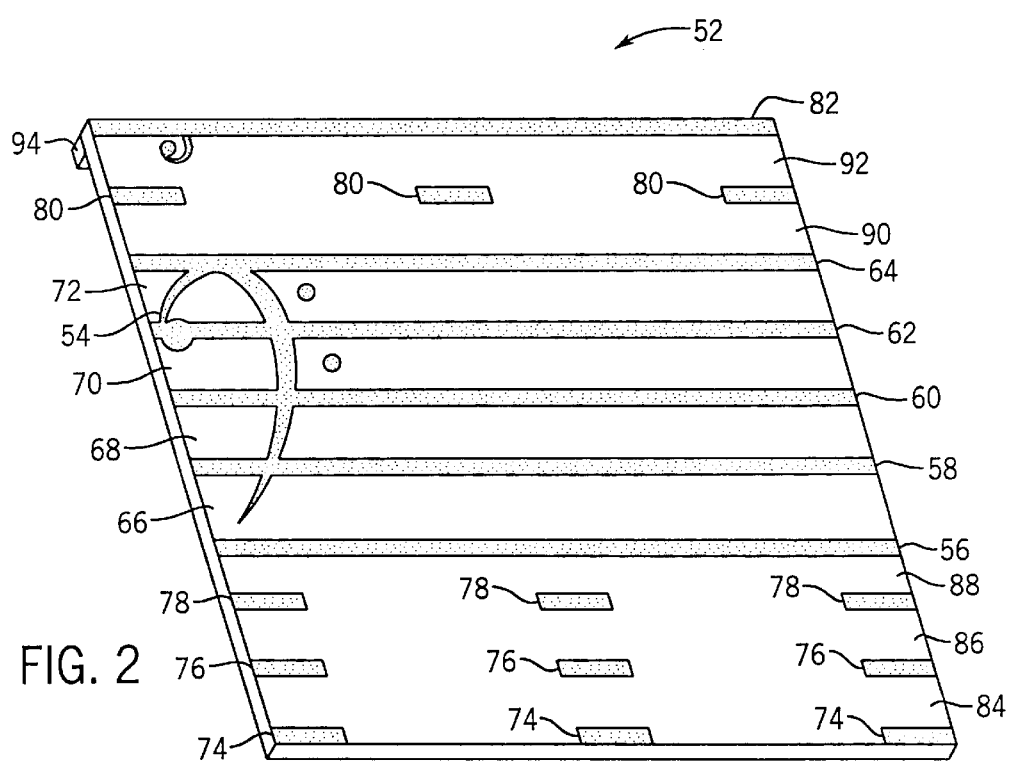

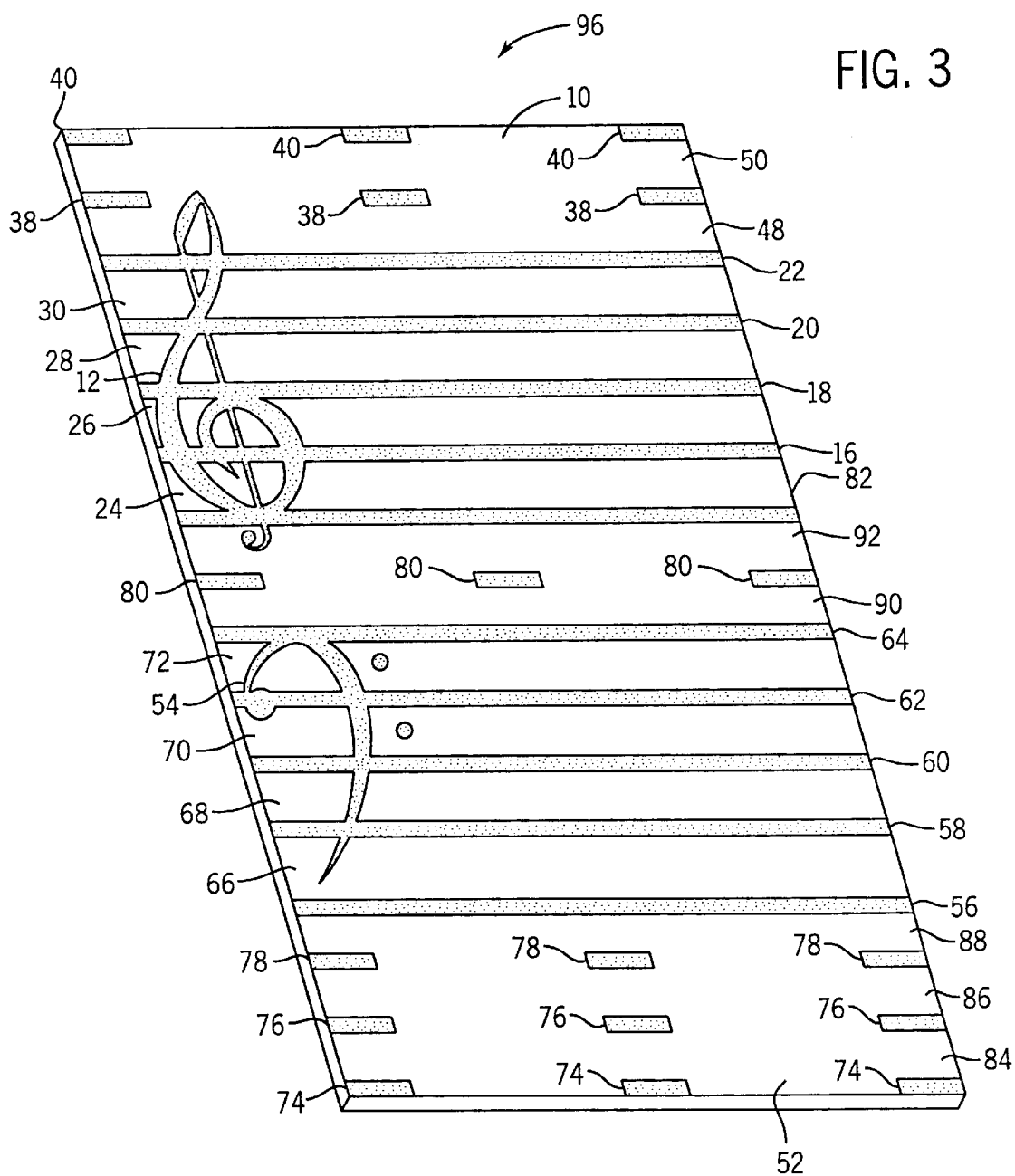

EDUCATIONAL GAME FOR TEACHING MUSICAL NOTATION

BACKGROUND OF THE INVENTION

The present invention relates to games, and in particular, to an educational game for teaching children how to read music by teaching them the locations of musical notes on a musical staff.

Children interested in singing or playing a musical instrument generally must have a basic understanding of musical notation. Musical notation is a system of symbols, signs and terms used to instruct musicians on how a piece of music is to be played or sung. The first step in teaching children how to read music is teaching them musical notation, basic musical notes, and the locations of the notes on a musical staff.

There have been many devices and games invented for teaching children how to read musical notes on a musical staff. However, many of these games and devices are quite complex and difficult for young children having little or no knowledge of music to comprehend.

Therefore, there is a need for a game to teach children of elementary age how to read musical notes on a musical staff with accuracy and speed, while maintaining the children's interest and motivation. The present invention provides a fun and exciting game involving the physical actions of players to locate and stand on the positions of musical notes on a musical staff playing surface. Playing the game improves the accuracy and speed with which young children learn to read music.

SUMMARY OF THE INVENTION

The present invention is directed to a game for teaching children the locations of musical notes on a musical staff. The game includes a game mat having a flat playing surface with musical staff indicia depicted thereon and means for selecting musical notes which the players locate on the game mat by standing on the appropriate positions of the musical staff depicted on the playing surface of the game mat. The game can utilize one of three unique game mats, the first having a treble clef staff indicia, the second having a bass clef staff indicia, and the third being the combination of the treble clef staff game mat and the bass clef staff game mat. The treble clef staff game mat and the base clef staff game mat have attachment means for removably attaching the bass clef staff game mat to the treble clef staff game mat for creating a great staff game mat.

The means for selecting musical notes may consist of a set of playing cards having letters printed on one side representing musical notes and the notes' locations on the great staff printed on the other side of the cards. Another means of selecting musical notes may consist of a spinner type indicator including a disk having a rotatable pointer mounted to the center of the disk and letters printed on segments representing musical notes. One of the players selects a musical note either by choosing a card from the deck of playing cards or spinning the spinner type indicator.

A timing device may also be utilized to limit a player's turn in locating the musical notes on the staff game mat. The timing device may include an hourglass with movement of sand within the hourglass defining the length of time of a player's turn. Once time has expired, it is the next player's turn.

Removable letters A, B, C, D, E, F, and G representing the basic musical notes may be removably placed at their appropriate locations on the musical staff game mat so that beginning players may learn the locations of the notes on the staff. Once the players become somewhat familiar with the note's locations, the individual letters may be removed from the playing surface of the game mat.

The game can be played using either the set of playing cards or the spinner type indicator for selecting the musical notes. In playing the game with the playing cards, the game consists of two players, a game mat having a musical staff depicted thereon and a timing device used to limit a players turn in locating the musical notes positions on the musical staff game mat. A first player selects cards from the deck of playing cards, while a second player races against the clock to find all of the musical notes positions on the musical staff game mat.

The players must choose a game mat by choosing between a treble clef staff game mat, a bass clef staff game mat or a great staff game mat which is the combination of the bass clef staff game mat fastened to the treble clef staff game mat. Once the players have selected which game mat to use, the game mat is laid out on an open floor indoors or an open location outdoors. The first player then resets the timing device, selects a card from the deck, and communicates the musical note depicted on the front side of the card to the second player standing along the bottom or base of the game mat. The second player then quickly locates and stands on all of the staff positions on the game mat where the musical note is located. Once the first player has verified that the second player has located all of the musical note's locations, the first player selects the next card from the deck of cards and communicates the next musical note to the second player standing alongside the game mat. The above steps of selecting a musical note and locating the note's positions on the game mat are repeated until all the cards have been selected or the players run out of time. The completed cards are then tallied and recorded, and the players may swap positions to restart the game.

In another embodiment of the invention, the spinner type indicator is used for selecting the musical notes. In this embodiment, two or more players race against each other to find the correct locations of the selected musical note on the musical staff game mat. A first player spins the spinner while the other remaining players race for position on the game mat. Again, a specific game mat is chosen and laid out in an open location either indoors or outdoors. The game is started by the first player spinning the spinner to select a musical note. Once the pointer has come to rest on a specific musical note, the player communicates the note to the other players who then quickly scramble to locate the positions of the musical note on the musical staff game mat. The first player to stand on a note location has the right to stay there while the other players must find another staff location for the same note. Once the players have found all of the note's locations on the game mat, the first player spins the spinner again to select the next musical note. This sequence continues until one of the players is unable to locate an open note position on the game mat. That player then becomes the spinner for the next game, while the original spinner joins the other players on the game mat.

In the playing of the game, the players quickly gain the ability to read music by learning the locations of musical notes on a musical staff.

These and other features, objects, and advantages of the present invention will be more fully understood and appreciated by reference to the appended drawings and detailed description.

BRIEF DESCRIPTION OF THE DRAWINGS

FIG. 1 is a perspective view of a treble clef staff game mat, which may be used in playing the game of this invention.

FIG. 2 is a perspective view of a bass clef staff game mat, which may be used in lieu of the game mat of FIG. 1.

FIG. 3 is a perspective view of a great staff game mat created by combining the game mats of FIGS. 1 and 2.

DETAILED DESCRIPTION OF THE INVENTION

Figure 4A:
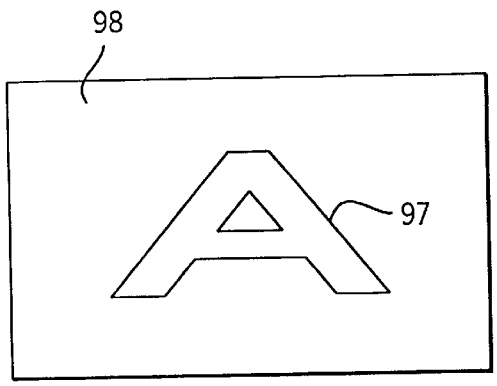
FIG. 4A is a front plan view of a playing card having a musical note printed thereon which may be used in playing a first embodiment of the game of this invention.

Referring to the drawings in more detail, FIG. 1 shows a perspective view of a treble clef staff game mat 10 which may be used in playing the game of this invention. The treble clef game mat 10 has a flat playing surface with musical indicia depicted thereon. The indicia includes a treble clef symbol 12, five substantially parallel horizontal staff lines 14, 16, 18, 20, 22 and spaces therebetween 24, 26, 28, 30.

Leger lines 32, 34, 36, 38, 40 depicted as three line segments located below and above the five staff lines on the left, right and center portions of the game mat are used to extend the treble clef staff to include other octaves so that it will accommodate additional musical note positions for a variety of musical instruments. The leger lines appear as line segments to distinguish them from the treble clef staff lines. In between the leger lines are spaces 42, 44, 46, 48 and 50 respectively.

Each line and space on the treble clef staff game mat is associated with a specific musical note. The treble clef encompasses the middle range notes E, F, G, A, B, C, D, E and F on or within the lines and spaces of the treble clef staff. The notes extending from the bottom leger line 32 to the top leger line 40 including the spaces therebetween include the following notes in order from bottom to top: F, G, A, B, C, D, E, F, G, A, B, C, D, E, F, G, A, B and C.

The treble clef staff game mat 10 is preferably made of fabric or vinyl, and shall be large enough to enable several players to stand on it at one time. The musical staff indicia is preferably printed on the playing surface, but may also be sewn or glued on.

FIG. 2 shows a second game mat, which may be used in playing the game of this invention. The bass clef staff game mat 52 has a flat playing surface with clef and staff indicia depicted thereon. The musical indicia on this game mat includes a bass clef symbol 54 and a set of five equally spaced substantially parallel horizontal staff lines 56, 58, 60, 62, 64 with four spaces 66, 68, 70, 72 therebetween.

Leger lines 74, 76, 78, 80, 82 depicted as three line segments located below and above the five staff lines on the left, right and center portions of the game mat are used to extend the bass clef staff so that it will accommodate additional musical note positions for a variety of musical instruments. The leger lines appear as line segments to distinguish them from the five equally spaced substantially parallel horizontal bass clef staff lines. Leger line 82 appears as a solid line to overlap the treble clef staff line 14 when the two mats are combined as shown in FIG. 3. Included between the leger lines are spaces 84, 86, 88, 90 and 92 respectively.

Each line and space on the bass clef staff game mat is associated with the specific musical note. The bass clef encompasses the notes G, A, B, C, D, E, F, G and A on or within the staff lines and spaces of the bass clef staff. The notes extending from leger line 74 to leger line 82, including the spaces therebetween include the following notes in order from bottom to top: A, B, C, D, E, F, G, A, B, C, D, E, F, G, A, B, C, D and E.

The bass clef staff game mat is preferably made of fabric or vinyl, and shall be large enough to enable several players to stand on it at one time.

FIG. 3 shows an extended great staff game mat 96 which may also be used in playing the game of this invention. The great staff game mat 96 is created by combining the treble clef staff game mat 10 with the bass clef staff game mat 52 shown in FIGS. 1 and 2. The treble and bass clef staff game mats 10, 52 are provided with attachment means for removably attaching the bass clef staff game mat 52 to the treble clef staff game mat 10.

In particular, the treble clef staff game mat 10 is provided with a strip of fastening material attached to the top of the playing surface along treble clef staff line 14. The bass clef staff game mat 52 is provided with a mating strip of fastening material 94 attached to the bottom surface of top leger line 82. The bass clef staff game mat 52 is removably attached to the treble clef staff game mat along the two mating strips of fastening material 94 and 14 respectively. The attachment means comprise reusable fastening material, such as Velcro or another type of reusable self-adhering strip, positioned to permit removable attachment of the bass clef staff game mat to the treble clef staff game mat. The game mats of FIGS. 1 and 2 may also be removably attached by buttons, snaps, or zippers and the like.

The great staff game mat 96 includes the treble clef symbol, the treble clef staff lines, the base clef symbol, the base clef staff lines, and leger lines above, below and in between the treble and base clef staff lines. The reference numbers shown in FIG. 3 are the same as those shown in FIGS. 1 and 2 since the great staff game mat is created by combining the game mats of FIGS. 1 and 2.

Figure 4B:
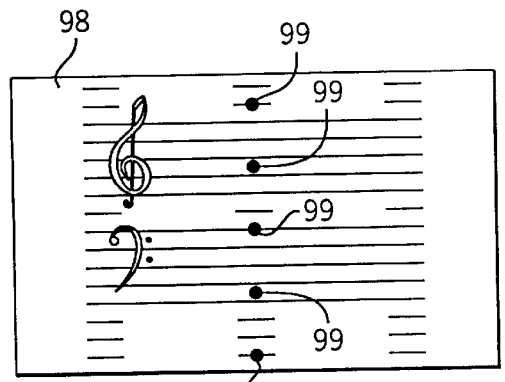
FIG. 4B is a rear plan view of the playing card of FIG. 4A showing the note's locations on the great staff.

A first embodiment of the game may be played with a set of playing cards displaying musical notes on the front side of the cards and displaying the note's locations on the great staff on the back side of the cards. Examples of these cards are shown in FIGS. 4A, 4B and 5A, 5B. FIG. 4A shows a front plan view of a playing card 98 having the musical note A 97 printed on the front of the card. FIG. 4B shows a rear plan view of the same card showing the positions 99 of note A on the great staff. Each card has a single musical note A, B, C, D, E, F or G printed on the front of the card, with the note's locations on the great staff printed on the back of the card. Each of the basic notes have several different locations on the great staff.

Figure 5A:
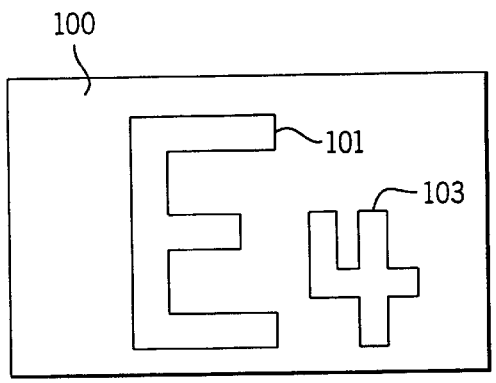
FIG. 5A is a front plan view of a second type of playing card having a musical note and finger location printed thereon for a stringed instrument, such as a violin.
Figure 5B:
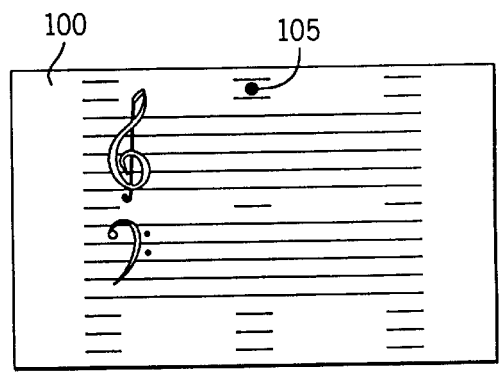
FIG. 5B is a rear plan view of the playing card of FIG. 5A showing the location of the musical note and finger location on the great staff.

A variation of the musical note playing cards is shown in FIGS. 5A and 5B. In addition to the basic notes, numbers representing finger positions may be printed along with the note on the front of the cards. FIG. 5A shows a playing card 100 with the note E 101 and finger position 4 103 printed on the card's front side. Printed on the back of the card, FIG. 5B, is the location 105 of note E with finger position 4 on the great staff. Each note and finger position has its own location on the great staff printed on the back of the card. The card 100 shown in FIGS. 5A and 5B is indicative of cards used for learning to play a stringed instrument, such as a violin.

A variety of playing card sets may be provided for individual musical instruments with the cards displaying the proper note and finger positions for that particular instrument. The card sets may vary depending upon the individual instrument application.

Figure 6:
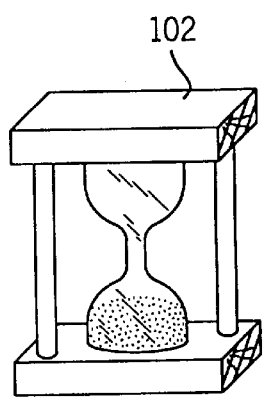
FIG. 6 is a perspective view of a timing device which may be used to limit a player's turn in playing the game.

FIG. 6 is a perspective view of a timing device 102 which may be used to limit the time of a player's turn in playing the game of this invention. FIG. 6 illustrates a three minute sand clock that allows a visible display of the time remaining for a player's turn. The sand clock 102 includes an hourglass with movement of sand within the hourglass defining the length of time of a player's turn. The sand clock 102 shown in FIG. 6 is only illustrative, as other timing devices such as analog or digital clocks may be used to limit a player's turn to a specific period of time.

Figure 7:
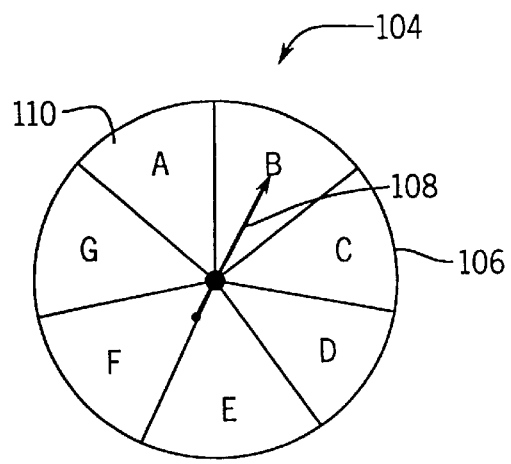
FIG. 7 is a plan view of a spinner type indicator having musical notes printed thereon which may be used in playing a second embodiment of the game of this invention.
Figure 8:
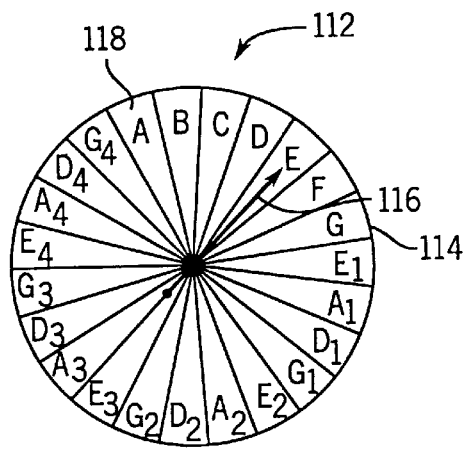
FIG. 8 is plan view of a second spinner type indicator having musical notes and finger locations printed thereon for a stringed instrument, such as a violin.

A second embodiment of the game may be played with a spinner type indicator. Examples of the spinner type indicators are shown in FIGS. 7 and 8. FIG. 7 shows a spinner type indicator 104 comprising a disk 106 and a rotatable pointer 108 which is mounted to the center of the disk. The disk 106 is divided into seven segments 110 corresponding to letters representing the seven basic musical notes A, B, C, D, E, F and G. A single musical note is printed on each segment of the disk.

FIG. 8 shows a variation of the spinner type indicator 104 shown in FIG. 7. This second spinner type indicator 112 is also comprised of a disk 114 and a rotatable pointer 116 attached to the center of the disk. The disk 114 is separated into a plurality of segments 118 representing the basic musical notes A, B, C, D, E, F and G, and also the musical note and finger positions for a stringed instrument, such as a violin. The spinner shown in FIG. 8 is specific to a violin. It shows the strings (E, A, D, G) and finger positions (1, 2, 3, 4) for playing a violin. The notes and finger positions are printed on each segment of the disk.

A variety of spinner type indicators may be provided for various musical instruments with each spinner having segments representative of the plurality of notes and finger positions available for that particular instrument. The spinner may vary depending upon individual instrument applications.

Figure 9:
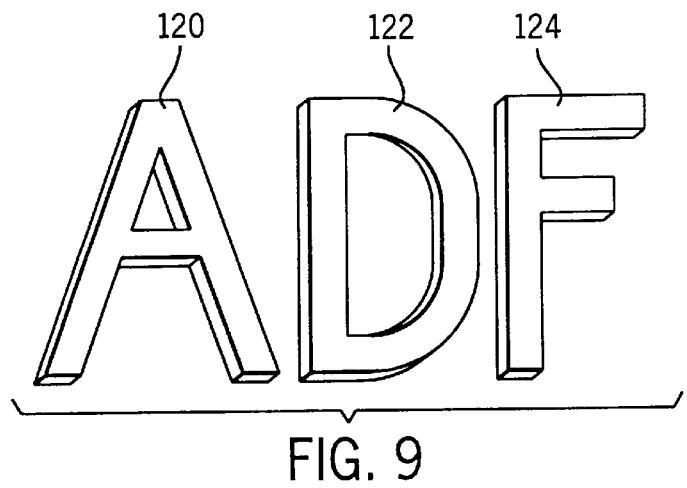
FIG. 9 is a perspective view of a plurality of letters representing musical notes which may be placed on the game mats of FIGS. 1, 2 and 3 for beginning players.

FIG. 9 shows a plurality of letters 120, 122 and 124 representing the basic musical notes which may be removably placed on the musical staff game mat at their appropriate staff locations to aid beginning players in identifying the positions of the musical notes on the musical staff. Once a player learns the positions of the notes on the staff, the letters representing the basic notes A, B, C, D, E, F and G may be removed from the game mat. The letters are preferably made of fabric.

The object of the game is to locate the correct positions of musical notes on a musical staff game mat. In a first embodiment of the game, the game is played with one of the game mats shown in FIGS. 1, 2 or 3; the playing cards of FIGS. 4A, 4B, 5A, 5B; the timing device shown in FIG. 6; and the letters shown in FIG. 9. In this embodiment, the game is played by two players. The players must choose which game mat to play with. For beginning players, it is best to choose one of the simpler treble or bass clef staff game mats, rather than the more complex great staff game mat. Also, the removable letters representing the basic musical notes may be placed on the game mat to aid beginning players. Once the players have learned the locations of the notes on the musical staff game mat, the letters may be removed.

In this embodiment, the game mat is laid out in an open location either indoors or outdoors. A first player resets the timing device and selects a playing card from the deck of musical note playing cards. Upon viewing the playing card, the first player shouts out the musical note to a second player who is standing along the base of the game mat. The second player then quickly locates and stands on all of the positions of the musical note on the musical staff game mat. The first player then verifies whether the locations are correct by viewing the back of the card having the musical note positions printed on a great staff. Once the second player has located all of the selected musical note positions on the game mat, the first player chooses the next card from the deck of playing cards. The second player then quickly locates and stands on all of the musical note positions on the musical staff game mat for the second playing card. This process of selecting musical notes and locating the notes' positions on the game mat continues until all of the playing cards have been selected or the time expires. At this point, the players may change positions to restart the game. The player that has correctly located the most musical notes on the musical staff game mat wins the game.

If more than two players play the game, the timing device is not used and the players race against each other rather than race against time. With more than two players, one player selects the musical note playing card while the other players line up along the base of the game mat. The player selecting the musical note playing card shouts out the musical note to the remaining players who then quickly locate the correct positions of the musical note on the musical staff game mat. The first player to stand on a correct position may stay there while the other players locate and stand on the remaining note positions. After all the positions have been found, the players line up along the base of the game mat and the next musical note playing card is selected. This process continues until all of the musical note playing cards have been selected. The winners of the game are the players who are first to locate and stand on the musical note positions on the musical staff game mat.

Other variations of playing the first embodiment of the musical notation game are contemplated to be within the scope of this invention. For example, musical note playing cards having musical note and finger positions for a particular instrument may be used instead of the basic musical note playing cards. The method of playing the game with the playing cards having musical note and finger positions for a particular instrument is no different than playing the game with the basic musical note playing cards. A player selects a card having the musical note and finger position printed thereon and communicates that information to a second player who then locates the musical note and finger position on the musical staff game mat. Also, the process of playing the game may be changed by the players swapping positions after each musical note card selection. In other words, after each musical note card selection a new player selects the next musical note card while the previous note card selector becomes one of the players locating and standing on the musical note positions on the musical staff game mat.

In a second embodiment of the game, the game is played with one of the spinner type indicators shown in FIGS. 7 and 8 rather than the playing cards shown in FIGS. 4A, 4B, 5A and 5B. In this embodiment, two or more players may participate. Instead of selecting a musical note from the playing cards, one player spins the pointer on the spinner to select which note's positions are to be located by the remaining players on the musical staff game mat.

In this embodiment, the game is played with one of the game mats shown in FIGS. 1, 2, or 3; the spinner type indicators shown in FIGS. 7 and 8; and the letters shown in FIG. 9. Again, the players must choose which game mat to play with. Also, the removable letters representing the musical notes may be placed on the game mat to aid beginning players.

To start the game, the game mat is laid out in an open location indoors or outdoors, and a first player selects a musical note by spinning the pointer of the spinner type indicator. Once the pointer stops on a segment displaying a musical note, the first player shouts out the musical note to the remaining players who are standing along the base of the game mat. The players standing along the base of the game mat then quickly locate and stand on the positions of the musical note on the musical staff game mat. The first player to stand on a note location may stay there while the remaining players search for another note location. The players compete among themselves to find and stand on all note locations on the musical staff game mat. After all of the note's locations have been found, the players return to the base of the game mat so that the first player may spin the pointer to select another musical note. This process continues until one of the players is unable to locate an open note position on the game mat. That player then becomes the spinner for the next game, while the original spinner joins the other players on the game mat. The winners of the game are the players who are first to locate and stand on the musical note positions on the musical staff game mat.

Variations in playing the second embodiment of the game are contemplated to be within the scope of the present invention. For example, each of the players may take turns spinning the spinner after each spin. In addition, the type of spinner used may be changed from a spinner having the seven basic musical notes printed on it to a spinner having the notes and finger positions for a specific instrument. The method of playing the game is the same. The players locate and stand on the locations of the musical note and finger position pointed to on the spinner.

It should be recognized that various other equivalents, alternatives, embodiments and modifications aside from those expressly stated, are possible and within the scope of the appended claims.

I claim:

1. An educational game for teaching musical notation comprising:
    a game mat having a flat playing surface with musical staff indicia depicted thereon, wherein the musical staff indicia includes at least one clef symbol, a plurality of musical staff lines and spaces therebetween;
    a set of playing cards having letters representing musical notes printed on one side of the cards with the notes' locations on a great staff printed on the other side of the cards; and
    wherein the locations of the musical notes represented on the playing cards is to be determined by at least one player physically occupying at least one location of the selected musical note on the appropriate staff line or space of the musical staff game mat.

2. The game as recited in claim 1 wherein the game mat is a treble clef staff game mat having a treble clef symbol and a musical staff depicted thereon including staff lines and spaces therebetween.

3. The game as recited in claim 2 wherein the treble clef staff game mat further includes leger lines and spaces depicted on the game mat above and below the staff lines for extending the treble clef staff to include additional musical note positions for a variety of musical instruments.

4. The game as recited in claim 1 wherein the game mat is a bass clef staff game mat having a bass clef symbol and a musical staff depicted thereon including staff lines and spaces therebetween.

5. The game as recited in claim 4 wherein the bass clef staff game mat further includes leger lines and spaces depicted on the game mat above and below the staff lines for extending the bass clef staff to include additional musical note positions for a variety of musical instruments.

6. The game as recited in claim 1 wherein the game mat is a great staff game mat having a treble clef symbol, a bass clef symbol, and musical staff lines and spaces depicted on the game mat.

7. The game as recited in claim 6 wherein the great staff game mat is created by removably attaching a bass clef staff game mat to a treble clef staff game mat along a staff line depicted on the bass and treble clef staff game mats.

8. The game as recited in claim 7 wherein the treble clef staff game mat is provided with a strip of fastening material attached to the top surface of the game mat, and the bass clef staff game mat is provided with a strip of fastening material attached to the bottom surface of the game mat, so that the bass clef staff game mat is removably attachable to the treble clef staff game mat along the two mating strips of fastening material.

9. The game as recited in claim 1 wherein the set of playing cards include letters representing musical notes and numbers representing finger positions for a particular musical instrument printed on one side of the cards, with the note and finger position locations on a great staff printed on the other side of the cards.

10. The game as recited in claim 1 further including a timing device.

11. The game as recited in claim 1 further including a plurality of letters representing musical notes that are removably attachable to the game mat for aiding beginning players in learning the locations of musical notes on the musical staff.

12. An educational game for teaching musical notation comprising:
    a game mat having a flat playing surface with musical staff indicia depicted thereon, wherein the musical staff indicia includes at least one clef symbol, a plurality of musical staff lines and spaces therebetween;
    a spinner type indicator comprising a disk, a rotatable pointer mounted to the center of the disk, and a plurality of segments with musical notes printed on the segments; and
    wherein the location of a musical note selected by a player spinning the rotatable pointer mounted to the center of the disk is to be determined by at least one other player physically occupying at least one location of the selected musical note on the appropriate staff line or space of the musical staff game mat.

13. The game as recited in claim 12 wherein the game mat is a treble clef staff game mat having a treble clef symbol and a musical staff depicted thereon including staff lines and spaces therebetween.

14. The game as recited in claim 12 wherein the game mat is a bass clef staff game mat having a bass clef symbol and a musical staff depicted thereon including staff lines and spaces therebetween.

15. The game mat as recited in claim 12 wherein the game mat is a great staff game mat having a treble clef symbol, a bass clef symbol, and musical staff lines and spaces depicted on the game mat.

16. The game as recited in claim 15 wherein the great staff game mat is created by removably attaching a bass clef staff game mat to a treble clef staff game mat along a staff line depicted on the bass and treble clef staff game mats.

17. The game as recited in claim 16 wherein the treble clef staff game mat is provided with a strip of fastening material attached to the top surface of the game mat, and the bass clef staff game mat is provided with a strip of fastening material attached to the bottom surface of the game mat, so that the bass clef staff game mat is removably attachable to the treble clef staff game mat along the two mating strips of fastening material.

18. The game as recited in claim 12 wherein the spinner type indicator includes musical notes and finger positions printed on the segments for a particular musical instrument.

19. A method of playing an educational game for teaching musical notation comprising the steps of:

(a) providing a game mat having a flat playing surface with musical staff indicia depicted thereon, wherein the musical staff indicia includes at least one clef symbol, a plurality of musical staff lines and spaces therebetween;

(b) providing a spinner type indicator comprising a disk having a plurality of segments with musical notes printed on the segments, and a rotatable pointer mounted to the center of the disk and extending into the segments for selecting a musical note;

(c) selecting a musical note from the spinner type indicator by spinning the rotatable pointer mounted to the center of the disk and communicating the selected note to players who are to locate the note's positions on the game mat; and (d) locating and physically occupying the appropriate staff line or space on the game mat for the selected musical note.

20. The method as recited in claim 19 further comprising repeating steps (c) and (d) until all of the musical notes have been selected.

21. The method as recited in claim 19 wherein the spinner type indicator includes musical notes and finger positions printed on the segments for a particular musical instrument.

22. A method of playing an educational game for teaching musical notation comprising the steps of:

(a) providing a game mat having a flat playing surface with musical staff indicia depicted thereon, wherein the musical staff indicia includes at least one clef symbol, a plurality of musical staff lines and spaces therebetween;

(b) providing a set of playing cards having letters representing musical notes printed on one side of the cards, with the notes' locations on a great staff printed on the other side of the cards for selecting a musical note;

(c) selecting a musical note from the set of playing cards and communicating the selected note to a player who is to locate the note's positions on the game mat;

(d) locating and physically occupying the appropriate staff line or space on the game mat for the selected musical note; and (e) providing a timing device for limiting the amount of time to locate the selected musical notes.

23. The method as recited in claim 22 further comprising repeating steps (c) and (d) until all of the musical notes have been selected, or time from the timing device has expired.

24. The method as recited in claim 22 wherein the set of playing cards include letters representing musical notes and numbers representing finger positions for a particular musical instrument printed on one side of the cards, with the note and finger position locations on a great staff printed on the other side of the cards.

* * * * *